Feb. 26, 1929.

J. S. MITCHELL 1,703,244

APPARATUS FOR GRADING LIVE STOCK

Filed Feb. 27, 1928    2 Sheets-Sheet 1

Inventor

John S. Mitchell

By Sturtevant Mason

Attorneys

Feb. 26, 1929.
J. S. MITCHELL
1,703,244
APPARATUS FOR GRADING LIVE STOCK
Filed Feb. 27, 1928 2 Sheets-Sheet 2
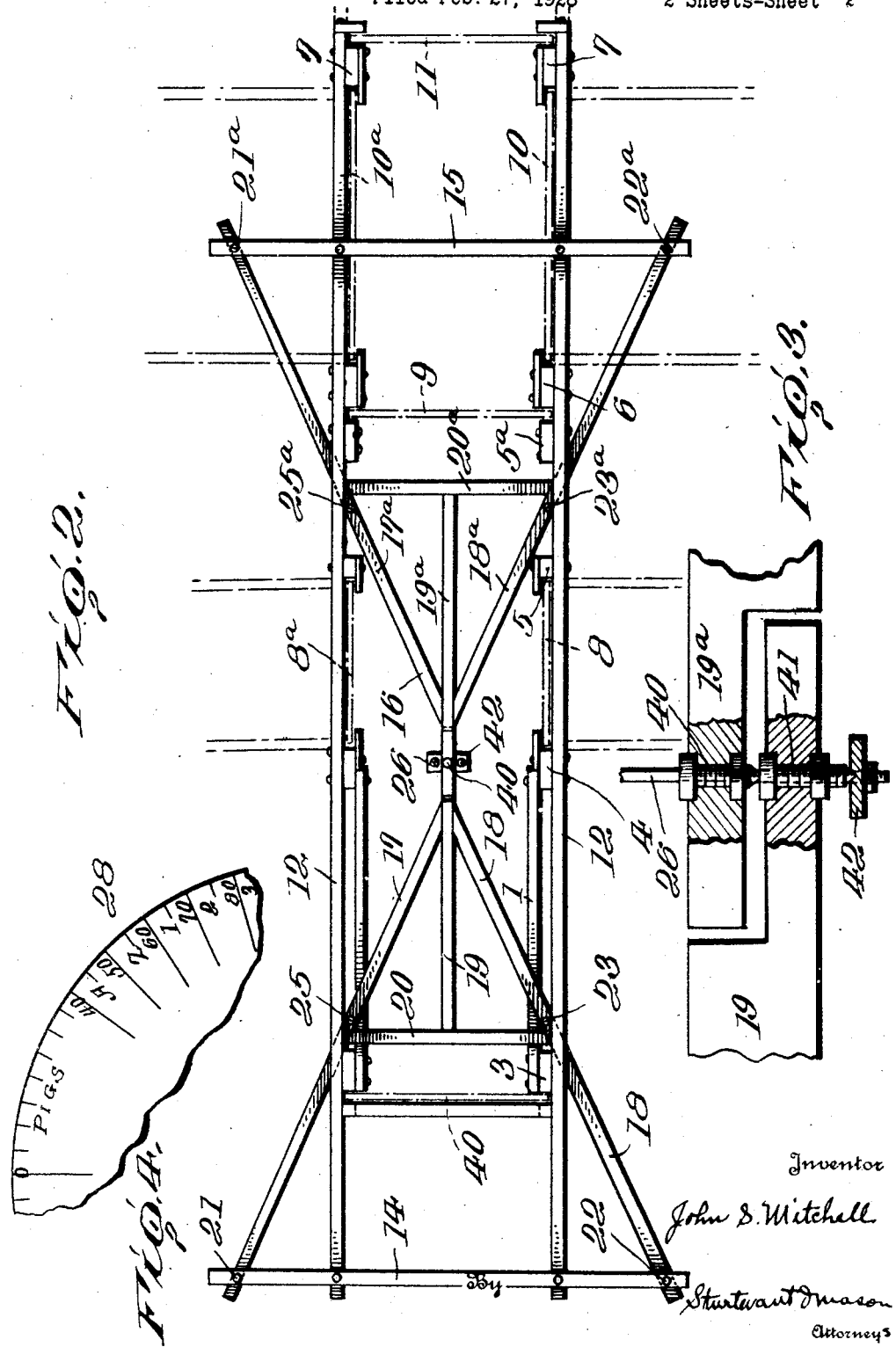

Patented Feb. 26, 1929.

1,703,244

UNITED STATES PATENT OFFICE.

JOHN S. MITCHELL, OF WINDFALL, INDIANA.

APPARATUS FOR GRADING LIVESTOCK.

Application filed February 27, 1928. Serial No. 257,327.

The invention relates to new and useful improvements in an apparatus for grading or sorting live stock. It is well known that live stock is graded according to weight, and the price quoted instead of being based on the weight of a single animal, is based on weights between certain limits, as for example, all animals weighing between one hundred and sixty and one hundred and eighty pounds, are placed in one grade, while the animals weighing from one hundred and eighty to two hundred and ten pounds will be placed in another grade, and the price quoted applies to all animals in the grade to which they are directed. With the present method of weighing animals, the weight of the animal is determined by inspection. Skilled operators approximate the weight of the animal by inspection, and this determines the grade to which it is directed.

An object of the present invention is to provide an apparatus wherein the animal may be weighed, and the weight of the animal automatically indicated on a suitable means visible to the operator, so that the operator may determine accurately the grade in which the animal should be placed.

A further object of the invention is to provide an apparatus of the above type with manually controlled devices operated from a point where the weight indicating device is visible to the operator, whereby the animal, after its weight is determined, may be directed to the proper stock pen containing other animals of the same grade.

These and other objects will in part be obvious and will in part be hereinafter more fully disclosed.

In the drawings which show by way of illustration one embodiment of the invention—

Fig. 2 is a plan view of the same, and

Fig. 3 is a detail showing the manner in which the adjacent ends of the triangular frames overlap and are supported.

Fig. 4 is a view of a section of the indicating dial.

Figure 1:
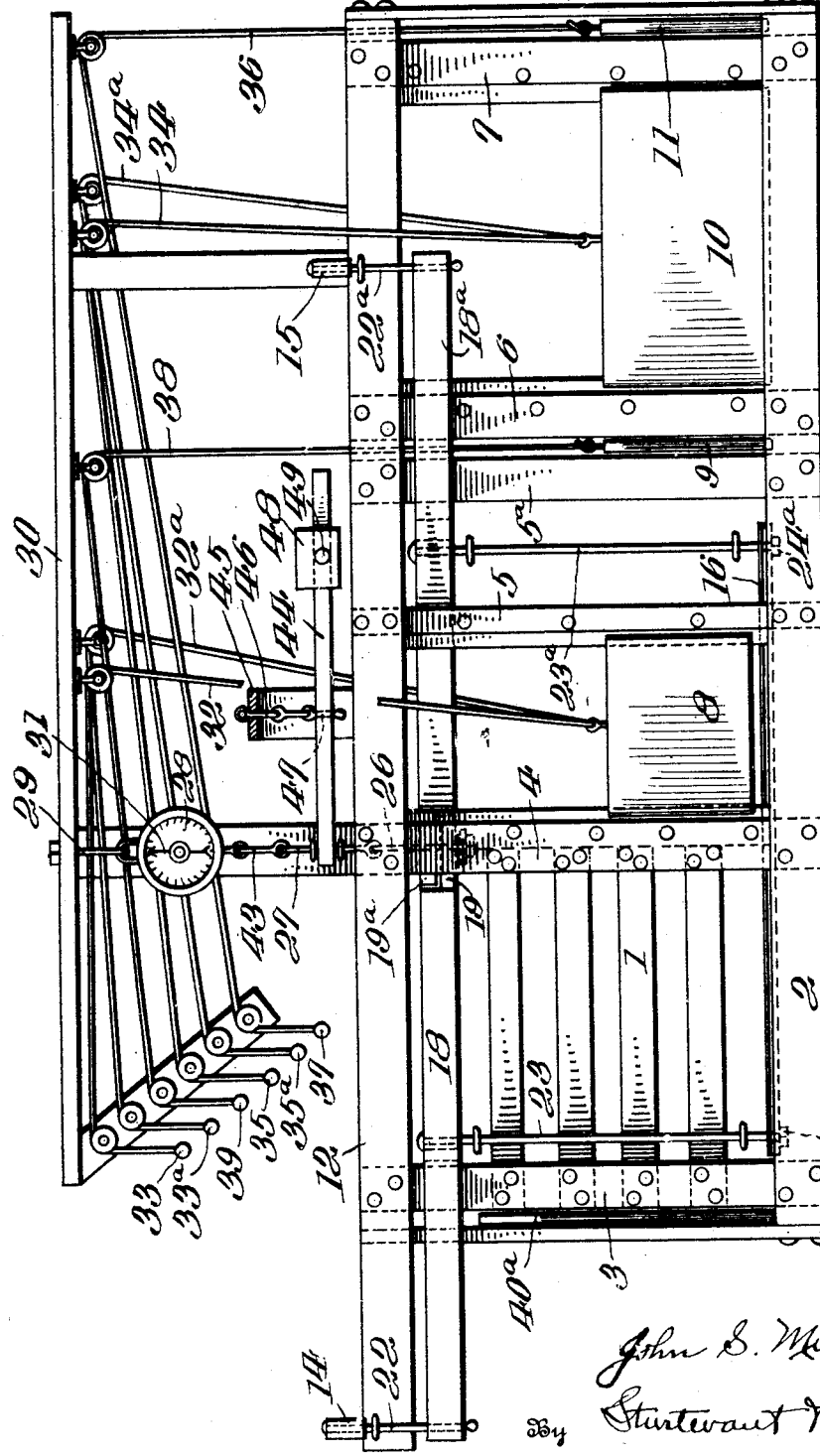
Figure 1 is a view showing more or less diagrammatically a side view of an apparatus embodying the improvements.

The invention has to do with an apparatus for sorting or grading live stock. The apparatus includes a suitable frame having spaced walls forming a runway along which the animals may pass one at a time. Associated with this frame is a weighing device having a platform which forms a part of the floor of the frame, so that the animal passing along the runway must pass over the platform of the weighing device. The weighing device is of a character so as to automatically indicate the weight of the animal, and the indicating device is visible to the operator. In the walls of the frame at points adjacent the sides, the end of and beyond the platform of the weighing device, are suitable openings, each of which is controlled by a gate. Manual means is provided for operating the gates, and the manual means for each gate may be operated from a position where the indicating means of the weighing device is visible.

The apparatus will probably be better understood by a detail reference to the drawings forming a part of the application. The invention is embodied in an apparatus consisting of a frame having spaced walls 1, 1. These walls may be made of wood or metal in any suitable way, and are spaced so that the animals may pass one after another along a runway. The side walls are of sufficient height so as to confine the animals to the runway. These side walls include suitable base bars 2 to which are attached vertical posts 3, 4, 5, 5ª, 6 and 7. There are posts at each side of the runway. The space between the posts 3 and 4 is closed by boards or any other suitable means. Between the posts 4 and 5 there is an opening which is controlled by a gate 8. The space between the posts 5 and 5ª is closed in, and between the posts 5ª and 6 there is a gate 9 which extends across the runway from one side thereof to the other. Opposite the gate 8 is a gate 8ª. Between the posts 6 and 7 there is an opening controlled by a gate 10, and opposite this gate 10 is a gate 10ª. At the end of the runway there is another gate 11.

Connecting the upper ends of the posts are suitable beams 12 and 12. Extending across from one wall to the other is a cross beam 14, which extends beyond the side walls. There is also a cross beam 15 extending transversely from one wall to the other and beyond the sides of the walls. These cross beams 14 and 15 join the upper beams 12 and 12 and rigidly support the side walls.

Located between the side walls and extending from a point adjacent the posts 3 to a point slightly beyond the posts 5 is a platform 16 of a weighing device. This platform forms a part of the floor of the runway, and is suspended so as to move up and down. A triangular frame consisting of bars 17, 18, 19 and 20 is formed and serves in part to suspend the platform of the weighing device. These bars are rigidly connected together, and the bars 17 and 18 are supported in loops 21 and 22, respectively. A rod 23 attached to the bar 18 intermediate its ends, extends down the side wall and is connected to a cross beam 24 which extends beneath the platform 16 and supports one end thereof. A rod 25 is connected to the bar 17 and extends down alongside the other side wall, and is connected to the other end of the bar 24. There is a similar triangular frame at the other end of the platform, which includes bars $17^a$, $18^a$, $19^a$ and $20^a$. These bars are rigidly connected together, and the bars $17^a$ and $18^a$ are suspended by loops $21^a$ and $22^a$, respectively. A rod $23^a$ extends down the side of the front wall, and is connected to a bar $24^a$ which extends across the other end of the platform and serves as a supporting means therefor. A rod $25^a$ is connected to the bar $17^a$ and extends down along the other wall and is connected to the other end of the bar $24^a$. Thus it is that the platform 16 is suspended by these two triangular frames. The adjacent ends of the bars 19 and $19^a$ are cut away and shaped so that the part carried by the bar $19^a$ overlies the part carried by the bar 19. The adjacent ends of the bars 19 and $19^a$ are connected so that they may move up and down freely. This is accomplished by providing a bolt 40 which is attached to the bar $19^a$ and extends through the same; said bolt has a pointed lower end which rests in a recess formed in the head of the bolt 41. The head of this bolt 41 is countersunk in the bar 19 and extends through the same. The lower end of the bolt 41 is pointed and this pointed end rests in a recess in a plate 42 and the plate 42 is supported by a clevis 26. This connection between the ends of the bars 19 and $19^a$ permits said bars as noted to freely move up and down. The clevis 26 is attached to a link 27 and the link 27 is in turn connected to a link 43 and the link 43 is attached to the weight indicating device 28. A balance lever 44 is connected to the link 27. This balance lever 44 is supported by a cross bar 45. There is a link 46 attached to said cross bar and this link carries a clevis 47 having a suitable knife edge supporting means for the lever 44. A weight 48 is slidably attached to the lever 44 and the weight may be held in set positions by a weight screw 49. The purpose of this weighted lever is to counterbalance the weight of the weighing platform 16 so that the dial of the weighing scale may be at zero when there is no animal on the weighing platform. The weight may be readily shifted to take care of any accumulation on the weighing platform so that at the beginning of a run the dial scale will stand at zero.

The weighing device indicated diagrammatically in the drawings at 28 is the usual form of dial weighing scale although the dial is changed so as to adapt it for the specific use of grading livestock. The weighing device 28 is, in turn, suspended by a supporting hook 29 and this supporting hook is carried by an upper frame member 30 which is carried on the main frame of the apparatus and extends lengthwise thereof.

Inasmuch as the supporting triangular frames for the platform of the weighing device are fulcrumed at the outer ends and support the platform at points substantially midway between the ends of the frames the dial of the weighing scale is, of course, properly graduated to take care of this proportioning of the supporting levers for the weighing platform. It will be noted that inasmuch as half of the weight of the animal is carried by the frames of the machine a weighing scale of 200 pounds capacity will take care of and indicate the weight of a 400 pound animal.

The gate 8 is controlled by a cord 32 which runs over suitable pulleys and is provided with a device 33 which may be readily grasped by hand by an operator standing where the indicating dial of the weighing scales is clearly visible. The gate 10 is operated by a cord 34 running over suitable pulleys and provided with a hand piece 35. The gate 11 is operated by a cord 36 running over suitable pulleys and provided with a hand piece 37. The gate 9 is operated by a suitable cord 38 which is provided with a suitable hand piece 39. The gate $8^a$ is operated by a suitable cord $32^a$ running over suitable pulleys and provided with a hand piece $33^a$. The hand pieces 33, $33^a$, 35, $35^a$, 37, and 39 are all closely associated at a point adjacent the indicator of the weighing device, so that the operator as soon as an animal passes on to the platform may note on the weighing device the exact weight of the animal, and then pull down the proper hand piece for opening the gate, so that the particular animal will be directed according to its exact weight, into the proper stock pen. Thus it is as the animals pass one after another, each animal may be directed to its proper stock pen according to its exact weight, which is not determined by judgment of the operator, but by the actual weighing of the animal. I have shown in the drawings, a section of a dial which is particularly adapted for grading pigs. In one suggested standard of grading all under 40 pounds are classed as pigs. Those weighing between 40 and 50 pounds are classed as A hogs; those weighing between 50 and 60 pounds are classed as Z hogs; those weighing between 60 and 70 pounds are classed as "ones"; and those between 70 and 80 pounds as "twos", and so on up. The dial shown in the drawings is so graduated and marked that at a glance the operator can tell by the position of the pointer which is determined by the weight of the animal on the platform just what grade the animal belongs to and the stock pen to which it should be directed. After this determination the proper gate may be quickly opened and the animal will pass into the proper stock pen.

A suitable horizontally sliding gate 40ᵃ is provided for controlling the delivery of the animals to the weighing platform, so that one at a time may be weighed and properly graded before another is admitted to the weighing platform.

It will be understood, of course, that the details of construction of the frame and the manual controlling devices for operating the gates, and also the weighing device, may be greatly modified without departing from the spirit of the invention as set forth in the appended claims.

Having thus described the invention, what I claim as new and desire to secure by Letters Patent, is—

1. In an apparatus for grading live stock, a frame structure including spaced walls forming a runway, said walls having gate-controlled openings, a weighing device including a platform forming a part of the floor of the frame, automatic weight indicating means mounted on said frame, and manual means operated from a point where said weight indicating means is visible to the operator for independently controlling said gates.

2. In an apparatus for grading live stock, a frame structure including spaced walls forming a runway, said walls having gate-controlled openings, a weighing device including a platform forming a part of the floor of the frame, automatic weight indicating means, triangular supporting frames fulcrumed at their outer ends and connected at their inner ends to the weight indicating means, said triangular frames carrying said platform, and manual means operated from a point where said weight indicating means is visible to the operator for independently controlling said gates.

3. In an apparatus for grading live stock, a frame structure including spaced walls forming a runway, said walls having gate-controlled openings a weighing device including a platform forming a part of the floor of the frame, automatically operated weight indicating means mounted on said frame and supporting said platform, a cord connected to each gate, suitable pulleys over which said cords extend to a point adjacent the weight indicating means, whereby the gates may be independently controlled by an operator from a point where said weight indicating means is visible.

4. In an apparatus for grading live stock, a frame structure including spaced walls forming a runway, said walls having gate-controlled openings, a weighing device including a platform forming a part of the floor of the frame, triangular frames having their apices adjacent each other and fulcrumed at their outer ends, on which said platform is mounted, automatically operated weight indicating means carried by the frame and supporting the adjacent ends of said triangular frames, and manual means operated from a point where said weight indicating means is visible to the operator for independently controlling said gates.

5. In an apparatus for grading live stock, a frame structure including spaced walls forming a runway, said walls having gate-controlled openings leading to separate stock pens, a weighing device associated with said frame structure and positioned so as to determine and indicate the weight of an animal passing along said runway, and means whereby the gate leading to the proper stock pen for grading the animal according to its weight may be opened.

6. In an apparatus for grading livestock, a frame structure including spaced walls forming a runway, said walls having gate-controlled openings, a platform forming a part of the floor of the frame and means for suspending said platform whereby the same is moved up and down to an extent determined by the weight of the animal on the platform said means including an indicating device for indicating the grade in which the animal on the platform should be classed.

7. In an apparatus for grading livestock a frame structure including spaced walls forming a runway, said walls having gate-controlled openings, a platform forming a part of the floor of the frame, a series of levers for suspending said platform, whereby said platform may move up and down to an extent determined by the weight of the animal on the platform, means for suspending said levers said suspending means including devices for indicating the grade in which the animal on the platform should be classed.

8. In an apparatus for grading livestock a frame structure including spaced walls forming a runway, said walls having gate-controlled openings, a platform forming a part of the floor of the frame, a series of levers for suspending said platform, whereby said platform may move up and down to an extent determined by the weight of the animal on the platform, means for suspending said levers said suspending means including devices for indicating the grade in which the animal on the platform should be classed, said lever, suspending the platform, being fulcrumed at points whereby a portion of the weight of the animal is carried by the frame and said indicating means being proportioned so as to correctly indicate the grade of the animal by the weight thereof.

9. In an apparatus for grading livestock, a frame structure including spaced walls forming a runway, said walls having gate-controlled openings, a platform forming a part of the floor of the frame and means for suspending said platform whereby the same is moved up and down to an extent determined by the weight of the animal on the platform said means including an indicating device for indicating the grade in which the animal on the platform should be classed, and a counterbalancing lever connected to said means which suspend the lever carrying the platform for counterbalancing the weight of the platform.

In testimony whereof, I affix my signature.

JOHN S. MITCHELL.